United States Patent [19]
Mihic

[11] Patent Number: 5,315,908
[45] Date of Patent: May 31, 1994

[54] ARRANGEMENT IN INSERT HOLDERS

[76] Inventor: Wlajko Mihic, Tegnervägen 9, S-802 28, Gävle, Sweden

[21] Appl. No.: 884,845

[22] Filed: May 13, 1992

Related U.S. Application Data

[63] Continuation of Ser. No. 601,729, Oct. 25, 1990, abandoned.

[30] Foreign Application Priority Data

Apr. 26, 1988 [SE] Sweden ................. 8801563

[51] Int. Cl.$^5$ .............................. B27B 33/12
[52] U.S. Cl. ........................... 83/845; 83/839
[58] Field of Search ............. 83/838, 839, 844, 845, 83/835, 840, 841, 842, 843

[56] References Cited

U.S. PATENT DOCUMENTS

| | | | |
|---|---|---|---|
| 75,734 | 3/1868 | Clemson | 83/845 |
| 555,414 | 3/1896 | Motznik | 83/845 |
| 1,455,968 | 5/1923 | Proctor | 83/845 |
| 3,785,021 | 1/1974 | Norgren | 83/845 X |
| 4,417,833 | 11/1983 | Wertheimer | 83/845 X |

FOREIGN PATENT DOCUMENTS

| | | |
|---|---|---|
| 0259847 | 3/1988 | European Pat. Off. |
| 3119834 | 12/1982 | Fed. Rep. of Germany |
| 441247 | 9/1985 | Sweden |
| 452713 | 12/1987 | Sweden |
| 676448 | 7/1979 | U.S.S.R. ................. 83/845 |

OTHER PUBLICATIONS

Brochure from Iscar Hartmetall GmbH, publisher and publication date unknown.

*Primary Examiner*—Richard K. Seidel
*Assistant Examiner*—Raymond D. Woods
*Attorney, Agent, or Firm*—Ware, Fressola, van der Sluys & Adolphson

[57] ABSTRACT

In an arrangement of an insert holder and a cutting insert, the insert (3) is received in a recess (2) in the insert holder and secured therein by clamping action between portions of the insert holder which define the recess. The recess for the insert (3) is defined in one direction by a substantially unyieldable portion formed with a straight guiding portion (4,5) coacting with a straight edge of the insert, and in the other direction by a nose-shaped resilient portion (8) formed with a shallow projection extending towards the straight guiding portion and having a defined top (12) of small extent in the direction of the recess. The cutting insert (3) comprises a shank (14) whose one side is formed with a guide ridge (15) adapted to seat on the guiding portion (4,5) of the recess (2) and whose opposite side comprises an inclined or bevelled portion (16) adjacent the free end of the shank (14). The bevelled portion (16) passing into a substantially straight surface portion (17) which serves as a sliding and abutment surface for the top (12) of the projection and which, in the direction away from the inclined or bevelled portion (16), converges slightly towards the insert side having the guide ridge (15). The free end (10) of the nose-shaped portion (8) is adapted to serve as an end stop for the cutting insert and to engage with a substantially transverse surface (19) on the head of the cutting insert.

8 Claims, 1 Drawing Sheet

FIG._1
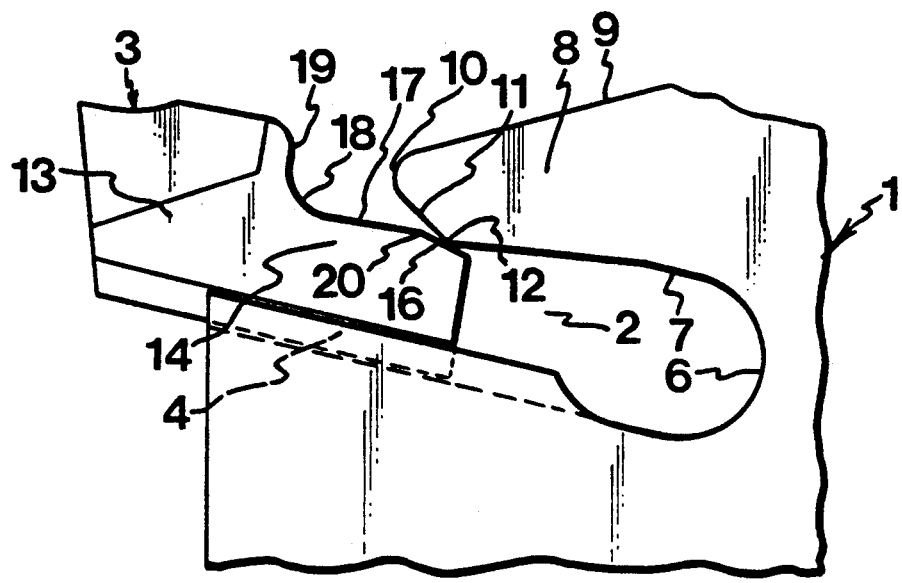
FIG._2
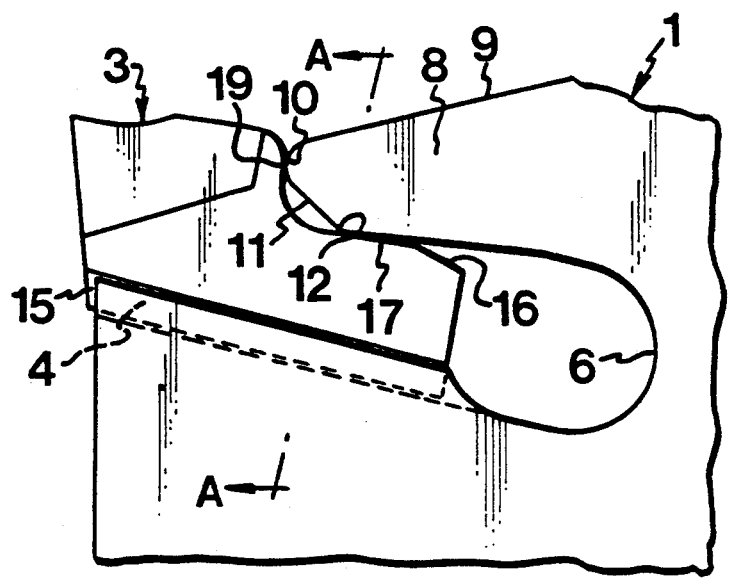
FIG._3
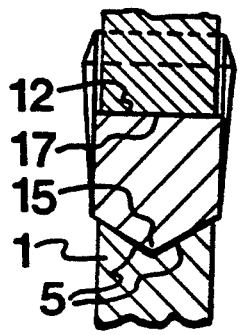

ARRANGEMENT IN INSERT HOLDERS

This is a continuation of copending application Ser. No. 07/601,729 filed on Oct. 25, 1990, now abandoned.

BACKGROUND OF THE INVENTION

The present invention relates generally to an insert holder 1 and more particularly to an insert holder for a cutting insert in a turning tool.

In most prior art insert holders, use is made of mechanical clamping means, such as screws or bodies attachable by screws, which hold the cutting insert in engagement with a seat in the insert holder. For insert holders primarily intended for applications where the available working space is small, e.g. for severing and plunge cutting operations, insert holders have previously been suggested, where the cutting insert is clamped by spring action in a seat facing the workpiece. Such an insert holder is formed with a thicker portion below the seat and a somewhat thinner yieldable portion above the seat. To stabilize the cutting insert in lateral direction, its edges, engaging with the sides of the seat, are formed with V-shaped grooves matching V-shaped elevations along the sides of the seat.

In using prior art insert holders, one must rely on the fact that the resilient engaging pressure remains, i.e. that the portion engaging the upper side of the cutting insert is permanently tensioned out of its non-activated position. In this situation there is a considerable risk of fatigue which results in decreasing clamping force and the cutting insert not being unresiliently kept in its seat. Especially when subjected to shock, the cutting insert is liable to be displaced in its seat. Heavy stress can also result in the cutting insert splitting or cracking along its center plane by cooperation between the V-shaped recess on the lower side of the cutting insert and the reversed V shape of the edge of the seat.

SUMMARY OF THE INVENTION

The object of the invention is to provide an insert holder and a matching cutting insert so designed that the clamping portion of the insert holder is during operation, substantially unloaded in with respect to resilience, whereby the risk of fatigue is eliminated and the cutting insert is firmly kept in position over a long period of operation. A further object of the new insert holder is to eliminate the risk of cracking or splitting of the cutting insert when subjected to shock stress.

The characteristic features of the new arrangement are stated in the appended claims.

BRIEF DESCRIPTION OF THE DRAWINGS

A preferred embodiment of an insert holder according to the invention and a matching cutting insert will now be described in detail with reference to the accompanying drawing in which:

FIG. 1 is a side view of the front portion of an insert holder, and a partly inserted cutting insert, FIG. 2 shows the same portion of the cutting holder, the cutting insert being in a fully inserted and fixed position, and FIG. 3 is a cross-sectional view taken along line A—A in FIG. 2.

DETAILED DESCRIPTION OF THE PREFERRED EMBODIMENT

The insert holder which in its entirety is generally designated by the numeral 1, comprises a shaft (not shown in detail) which is designed to fit the clamping means. The shaft can, behind the shown front portion, be wider and higher than the front portion adapted to receive the cutting insert. In the front end of the insert holder there is formed a recess 2 adapted to receive the cutting insert which in its entirety is generally designated by the number 3.

The lower side of the recess 2 is defined by a bottom 4 which is sloping downwards-backwards and which, along the major part of its length, is formed of two surfaces forming a V-shaped groove 5. The inner end of the recess 2 is defined by a rounded edge 6 passing into an upper side 7 which is bent slightly downwards.

A nose-shaped portion 8 defining the upper side of the recess 2 extends not quite all the way to the front end of the insert holder 1 and has a top side 9 facing obliquely upwards and passing over a rounded front end 10 into a substantially planar portion 11 directed obliquely downwards and meeting, while forming a shallow projection, the obliquely downwardly bent upper side 7 of the recess so as to form an abutment edge 12.

The cutting insert 3 of which the cutting edge portion need not be described here, comprises a head 13 and a shank 14. The underside of the cutting insert 3 is formed with a V-shaped longitudinal ridge 15 which is complementary to the bottom 4 of the recess, but the angle of which preferably is slightly more shallow than the angle of the recess. The upper side of the shank 14 is formed, as seen from behind, with an inclined or bevelled surface 16 passing into an abutment and sliding surface 17 which, in the direction of the head of the cutting insert, converges slightly towards a line along the ridge 15 of the cutting insert. The deviation is minor and preferably is of the order of 4°. The abutment and sliding surface 17 passes via a rounded surface 18 into an engagement surface 19 extending transversely of the longitudinal direction of the cutting insert.

To mount the cutting insert 3 in the insert holder 1, the V-shaped ridge 15 of the cutting insert is positioned in the V-shaped groove 5 at the bottom of the insert holder recess and is pressed inwards. By cooperation between the abutment edge 12 on the lower side of the nose-shaped projection 8 and the bevelled surface 16 of the cutting insert, the nose-shaped portion 8 is bent upwards against its inherent resilience. The outward or upward bending of the portion 8 reaches its maximum at the point 20 in which the bevelled surface 16 passes into the abutment and sliding surface 17 and then decreases as the cutting insert 3 is pushed further into the recess 2. When the front end 10 of the nose-shaped portion 8 engages the transverse engagement surface 19 of the head 13 of the cutting insert, the abutment edge 12 has been moved along the abutment and sliding surface 17 of the cutting insert so far that the upward bending of the nose-shaped portion has been reduced to a substantial extent.

It is thus obvious that the mounting of the cutting insert 3 in the recess 2 of the insert holder 1 is, after an initial resistance has been overcome, facilitated by the inherent resilience of the nose-shaped portion 8. Withdrawal of the cutting insert requires, however, a successively increasing force as the nose-shaped portion 8 is forced outwards by the sloping abutment and sliding surface 17.

Since the abutment edge 12 cooperates with the planar surface 17, no defined end or bottom position will arise there, but this position is determined only by the engagement between the end 10 of the nose-shaped portion and the rear surface 19 of the head of the cutting insert 3. As a result, the requirements for precision when manufacturing cutting inserts can be kept within limits. In other words, certain deviations from an ideal value, especially with respect to the height of the shank, can be allowed, and yet a fully acceptable clamping is obtained. A negative deviation in vertical direction merely results in a slightly reduced tensional force, whereas a positive deviation results in a slightly increased tensional force.

The design of the guiding portions, i.e. the V-shaped groove 5, in relation to the design of the V-shaped underside of the cutting insert 3 is essential to the function. As is best shown in FIG. 3, the angle between the sides of the V-shaped groove deviates from the angle between the surfaces of the cutting insert facing the groove 5, and more precisely such that engagement is established only along the edges of the V groove and the cutting insert 3, respectively, while there is a clearance between the lower edge of the cutting insert 3 and the deeper part of the bottom of the groove 5. This causes the cutting insert 3 to be firmly located in the groove 5, and the risk of tilting in lateral direction is eliminated.

To achieve lateral stability, the cutting insert 3 engages the insert holder 1 along three lines, one line along each side of the V-shaped groove 5 and one line oriented transversely of these lines at the abutment edge 12, i.e. the position in which the tip of the projection or the abutment edge 12 engages the planar surface 17. As a result, the desired stability is achieved even in cases where the cutting insert and insert holder have small widths of some.

The angular difference between the surfaces of the V-shaped groove 5 and the bottom surfaces of the cutting insert has a further function, i.e. a further possibility of compensating for deviations from tolerances is obtained. Should the cutting insert be oversized and bordering on the permissible range, the force of the portion 8, which acts downwards via the abutment edge 12, will be so great that the sides of the V-shaped groove 5 can be elastically deformed slightly outwards, while maintaining the engagement with the underside of the cutting insert 3.

The cutting insert 3 thus is firmly supported over its entire length by cooperation between the V-shaped guiding ridge 15 on the underside of the cutting insert 3 and the V-shaped groove 5 at the lower edge of the recess 2 of the insert holder 1, and is kept in firm engagement with this edge by the resilience of the nose-shaped portion 8, which acts along a single transverse line, i.e. along the edge 12 oriented transversely of the longitudinal direction of the cutting insert. Through the design described above, all tendencies towards tilting of the cutting insert are eliminated, even if it is subjected to heavy shock from the workpiece.

The invention is not limited to that described above and shown in the drawing, but can be modified in various ways within the scope of the appended claims.

I claim:

1. An arrangement in an insert holder and a cutting insert, said insert (3) being received in a recess (2) in said insert holder (1) and secured therein by clamping between portions of said insert holder which define said recess, said recess for the insert (3) being defined on one side by a portion dimensioned to substantially unyieldably take up occurring stress and formed with a straight guiding portion (4, 5) coacting with a straight edge of the insert, and, on an other side of said recess for the insert (3), by a nose-shaped resilient portion (8) of smaller extent in a longitudinal direction of said recess than the straight guiding portion (4, 5), said nose-shaped resilient portion (8) having an inherent resilience, said insert (3) comprising a shank (14) wherein one side is formed with a guide means (15) adapted to the guiding portion (4,5) of said recess (2) and an opposite side comprises an inclined portion (16), and a free end (10) of said nose-shaped portion (8) being adapted to serve as an end stop for said insert and engage with a substantially transverse surface (19) on the insert, characterized in that the resilient portion (8) forming the other side of the recess is formed with a shallow projection extending towards the one side of the recess and approaching the straight guiding portion (4, 5) at a defined projection top (12) of small extent in the longitudinal direction of said recess; that the inclined portion (16) of the shank (14) passes into a substantially straight planar surface portion (17) of the shank (14) which serves as a sliding and abutment surface for said defined projection top (12), and, in a direction away from said inclined portion (16), said substantially straight planar surface portion (17) converges slightly towards the one side of the shank (14); and that the inclined portion (16) is adapted, during insertion of said insert (3) longitudinally into the recess (2), by engagement with the defined projection top (12) of said shallow projection, to bend the nose-shaped portion (8) against the inherent resilience thereof, and allow, during further insertion, only transverse linear engagement of the defined projection top (12) with said substantially straight planar surface portion (17) with a successive reduction of the bending of said nose-shaped resilient portion (8), said transverse linear engagement being in a direction transverse to the longitudinal direction of said recess (2).

2. The arrangement as claimed in claim 1, characterized in that an angle defined between the sliding and abutment surface (17) of the shank of the insert and said guide means (15) of the insert is in the order of four degrees.

3. The arrangement as claimed in claim 1, characterized in that, when said insert is fully inserted in said insert holder, contact between said insert holder and said insert occurs only between said guiding portion (4,5) and said guide means (15), between said defined projection top (12) and said sliding and abutment surface (17), and between said free end (10) and said substantially transverse surface (19).

4. The arrangement as claimed in claim 3, characterized in that said guiding portion (4,5) on the one side of the recess of the insert holder is a substantially straight surface along its entire length and that said guide means (15) is a substantially straight surface along its entire length.

5. The arrangement as claimed in claim 1, characterized in that said guiding portion on the one side of the recess of the insert holder is a substantially straight surface along its entire length and that said guide means (15) is a substantially straight surface along its entire length.

6. The arrangement as claimed in claim 1, characterized in that the straight guiding portion (4,5) and the nose-shaped portion are closest at the defined projection top and an imaginary plane extends normal to the straight guiding portion (4,5) through the defined projection top.

7. An arrangement in an insert holder and a cutting insert, said insert (3) being received in a recess (2) in said insert holder (1) and secured therein by clamping between portions of said insert holder which define said recess, said recess for the insert (3) being defined on one side by a portion dimensioned to substantially unyieldably take up occurring stress and formed with a straight guiding portion (4,5) coacting with a straight edge of the insert, and, on an other side of said recess for the insert (3), by a nose-shaped resilient portion (8) of smaller extent in a longitudinal direction of said recess than the one side of said recess formed with the guiding portion, said nose-shaped resilient portion (8) having an inherent resilience, said insert (3) comprising a shank (14) wherein one side is formed with a guide means (15) adapted to the guiding portion (4,5) of said recess (2) and an opposite side comprises an inclined portion (16), and a free end (10) of said nose-shaped portion (8) being adapted to serve as an end stop for said insert and engage with a substantially transverse surface (19) on the insert, characterized in that the resilient portion (8) forming the other side of the recess is formed with a shallow projection extending towards the one side of the recess and has a defined projection top (12) of small extent in the longitudinal direction of said recess; that the inclined portion (16) of the shank (14) passes into a substantially straight surface portion (17) of the shank (14) which serves as a sliding and abutment surface for said defined projection top (12), and, in a direction away from said inclined portion (16), said substantially straight surface portion (17) converges slightly towards the one side of the shank (14); and that the inclined portion (16) is adapted, during insertion of said insert (3) into the recess (2), by engagement with the top (12) of said shallow projection, to bend the nose-shaped portion (8) against the inherent resilience thereof, and allow, during further insertion, engagement of the top (12) with said sliding and abutment surface (17) with a successive reduction of the bending of said nose-shaped resilient portion (8), said guiding portion on the one side of the recess of the insert holder comprises a pair of surfaces defining a substantially V-shaped groove (5), and that said guide means along the straight edge of the insert consists of a pair of surfaces defining a complimentarily V-shaped ridge (15), and that an angle defined between the surfaces of the ridge is greater than an angle defined between the surfaces of said groove.

8. The arrangement as claimed in claim 7, characterized in that an angle defined between the sliding and abutment surface (17) of the shank of the insert and said guide means (15) of the insert is in the order of four degrees.

* * * * *